(12) United States Patent
McEvoy et al.

(10) Patent No.: US 8,980,387 B2
(45) Date of Patent: Mar. 17, 2015

(54) METHOD OF COATING A SURFACE AND ARTICLE INCORPORATING COATED SURFACE

(75) Inventors: Kevin Paul McEvoy, Ballston Spa, NY (US); Ambarish Jayant Kulkarni, Glenville, NY (US); James Anthony Ruud, Delmar, NY (US)

(73) Assignee: General Electric Company, Niskayuna, NY (US)

( * ) Notice: Subject to any disclaimer, the term of this patent is extended or adjusted under 35 U.S.C. 154(b) by 545 days.

(21) Appl. No.: 13/283,175

(22) Filed: Oct. 27, 2011

(65) Prior Publication Data

US 2013/0108810 A1    May 2, 2013

(51) Int. Cl.
| | |
|---|---|
| B29D 22/00 | (2006.01) |
| B29D 23/00 | (2006.01) |
| B32B 1/08 | (2006.01) |
| B31B 45/00 | (2006.01) |
| C23C 18/06 | (2006.01) |

(Continued)

(52) U.S. Cl.
CPC .............. *C23C 18/06* (2013.01); *C23C 18/1212* (2013.01); *C23C 18/1216* (2013.01); *C23C 18/122* (2013.01); *C23C 18/1241* (2013.01); *C23C 18/1283* (2013.01); *B01D 5/0012* (2013.01)
USPC .......... 428/34.1; 428/336; 427/527; 427/532; 427/541; 427/185; 427/236; 427/404

(58) Field of Classification Search
CPC .............. B05D 3/02; B05D 1/18; B05D 1/02; B05D 1/28; C09D 7/12; B32B 1/08
USPC ................. 427/527, 532, 541, 185, 236, 404; 428/34.1, 336
See application file for complete search history.

(56) References Cited

U.S. PATENT DOCUMENTS

| | | |
|---|---|---|
| 3,466,189 A | 9/1969 | Erb |
| 3,510,455 A | 5/1970 | Olson |

(Continued)

FOREIGN PATENT DOCUMENTS

EP            348288 B1    8/1992

OTHER PUBLICATIONS

Izumi et al., "Zirconia Coating on Stainless Steel Sheets from Organozirconium Compounds", Journal of the American Ceramic Society, Aug. 1989, vol. 72, No. 8, pp. 1465-1468.

(Continued)

*Primary Examiner* — Michael C Miggins
(74) *Attorney, Agent, or Firm* — Paul J. DiConza (57) ABSTRACT

A method of coating a surface, preparing a doped metal-ion precursor solution for coating, and an article including a component coated by the described method are disclosed. The method of coating includes applying a fluoro-silane doped metal-ion precursor solution on the surface to form a coated surface. The metal-ion precursor solution includes greater than about 0.6 molar percent concentration of a metal-ion precursor in a solvent comprising an alcohol. The method of preparing the doped metal-ion precursor solution includes dissolving a metal-ion precursor in a solvent comprising an alcohol at a temperature greater than about 100° C. and refluxing at a temperature greater than about 150° C. such that the concentration of metal-ion precursor in the solution is greater than 0.6 molar percent of the solution, and adding a fluoro-silane to the metal-ion precursor solution.

29 Claims, 7 Drawing Sheets

(51) Int. Cl.
*C23C 18/12* (2006.01)
*B01D 5/00* (2006.01)

(56) References Cited

U.S. PATENT DOCUMENTS

| | | |
|---|---|---|
| 3,878,885 A | 4/1975 | Deronzier et al. |
| 3,899,366 A | 8/1975 | Tajkowski |
| 4,633,023 A | 12/1986 | Griffith et al. |
| 5,048,600 A | 9/1991 | Stout et al. |
| 6,192,979 B1 | 2/2001 | Koch et al. |
| 6,571,865 B1 | 6/2003 | Shi et al. |
| 6,859,542 B2 | 2/2005 | Johannsen et al. |
| 7,901,798 B2 | 3/2011 | Gentleman et al. |
| 2003/0017349 A1 | 1/2003 | Brown et al. |
| 2005/0129927 A1 | 6/2005 | Minami et al. |
| 2007/0031639 A1 | 2/2007 | Hsu et al. |
| 2010/0096113 A1 | 4/2010 | Varanasi et al. |
| 2010/0115950 A1 | 5/2010 | Haje et al. |
| 2010/0129645 A1 | 5/2010 | Gensler et al. |

OTHER PUBLICATIONS

Izumi et al., "Coating of Fluorine-Doped ZrO2 Films on Steel Sheets by Sol-Gel Method", Journal of Non-Crystalline Solids, May 1990, vol. 121, No. 1-3, pp. 344-347.

Izumi et al., "Water Repellent Property of ZrO2 Modified with Fluoro-Alkyl Groups on Steel Sheets", Nisshin Steel Report, Dec. 1990, 10 Pages.

Sermon et al., "Fluoroalkylsilane Modification of Sol-Gel SiO2-TiO2 Coatings", Journal of Sol-Gel Science and Technology, 2004, vol. 32, No. 1-3, pp. 293-296.

METHOD OF COATING A SURFACE AND ARTICLE INCORPORATING COATED SURFACE

BACKGROUND

The invention relates generally to a method of coating a surface and an article incorporating the coated surface. More particularly the invention relates to coating a surface with a doped metal-ion precursor solution and making a coated surface having a doped metal-ion compound.

Hydrophobic and super-hydrophobic surfaces are desirable in numerous applications, such as windows, DVD disks, cooking utensils, clothing, medical instruments, automotive and aircraft parts, textiles, and like applications. Typically hydrophobic surfaces have been created by changing surface chemistry or by surface texturing, or by combining both of these methods. Altering the surface chemistry of the surface in order to achieve hydrophobicity typically involves coating the surface with a low surface energy coating. However, most of such hydrophobic coatings suffer from lack of durability in their application environment with issues of poor adhesion to the surface, low mechanical robustness and lost functionality. Moreover, most of the existing techniques for altering the wetting resistance of the surface suffer from certain drawbacks, such as processes that are time consuming, difficult to control, expensive or ineffective in producing films with sufficient durability, and are usually not scalable to large surface areas. Therefore, there is a need for an inexpensive, easy, and effective means for achieving surfaces with wetting resistance.

BRIEF DESCRIPTION

Briefly, in one embodiment, a method of coating a surface is disclosed. The method includes applying a fluoro-silane doped metal-ion precursor solution on the surface to form a coated surface. The metal-ion precursor solution includes greater than about 0.6 molar percent concentration of a metal-ion precursor in a solvent comprising an alcohol.

In one embodiment, a method is disclosed. The method includes preparing a metal-ion precursor solution of greater than about 0.6 molar percent concentration. Preparing the metal-ion precursor solution includes dissolving a metal-ion precursor in a solvent comprising an alcohol at a temperature greater than about 100° C. and refluxing at a temperature greater than about 150° C. A doped metal-ion precursor solution was prepared by adding a fluoro-silane to the metal-ion precursor solution.

In one embodiment, a method of coating a surface is disclosed. The method includes applying a heptadecafluoro-1,1,2,2-tetrahydrodecyl trimethoxysilane doped metal-ion precursor solution on the surface to prepare a coated surface. The doped metal-ion precursor solution comprises a concentration greater than about 0.6 molar percent of metal-ion precursor in a solvent comprising an alcohol. The coated surface formed is further heat-treated in a temperature range from about 200° C. to about 300° C. for about 15 minutes.

DRAWINGS

These and other features, aspects, and advantages of the present invention will become better understood when the following detailed description is read with reference to the accompanying drawing, wherein.

DETAILED DESCRIPTION

Embodiments of the present invention are directed to a method of coating a surface, and an article including the coated surface.

In the following description and the claims that follow, whenever a particular aspect or feature of an embodiment of the invention is said to comprise or consist of at least one element of a group and combinations thereof, it is understood that the aspect or feature may comprise or consist of any of the elements of the group, either individually or in combination with any of the other elements of that group. Similarly, the singular forms "a", "an" and "the" include plural referents unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "about" may not be limited to the precise value specified, and may include values that differ from the specified value. In at least some instances, the approximating language may correspond to the precision of an instrument for measuring the value. In the present discussions it is to be understood that, unless explicitly stated otherwise, any range of numbers stated during a discussion of any region within, or physical characteristic of, is inclusive of the stated end points of the range.

The "wetting resistance" of a surface is determined by observing the nature of the interaction occurring between the surface and a drop of a reference liquid disposed on the surface. The droplets, upon contact with a surface, may initially spread over a relatively wide area, but often contract to reach an equilibrium contact area. Droplets contacting a surface having a low wetting resistance to the liquid tend to remain spread over a relatively wide area of the surface (thereby "wetting" the surface). In the extreme case, the liquid spreads into a film over the surface. On the other hand, where the surface has a high wetting resistance for the liquid, the liquid tends to contract to well-formed, ball-shaped droplets. In the extreme case, the liquid forms nearly spherical drops that either roll off of the surface at the slightest disturbance or lift off from the surface due to impact momentum. As used herein, the term "wetting-resistant" refers to surfaces that are resistant to wetting by reference liquids.

As used herein, the term "contact angle" is referred to as the angle a stationary drop of a reference liquid makes with a horizontal surface upon which the droplet is disposed. Because wetting resistance depends in part upon the surface tension of the reference liquid, a given surface may have a different wetting resistance (and hence form a different contact angle) for different liquids. As used herein, the term "advancing contact angle" is the angle when a sessile drop has the maximum volume allowable for a liquid-solid interfacial area at thermodynamic equilibrium. The term "receding contact angle" is the angle when a sessile drop has the minimum volume allowable for a liquid-solid interfacial area at thermodynamic equilibrium. The difference between the maximum advancing contact angle and receding contact angle values is called the contact angle hysteresis.

Contact angle is used as a measure of the wettability of the surface. If the liquid spreads completely on the surface and forms a film, the contact angle is 0 degrees. As the contact angle increases, the wetting resistance increases. The terms "hydrophobic" and "super-hydrophobic" are used to describe surfaces having very high wetting resistance to water. As used herein, the term "hydrophobic" will be understood to refer to a surface that generates a contact angle of greater than about 90 degrees with water. As used herein, the term "super-hydrophobic" will be understood to refer to a surface that generates a contact angle of greater than about 120 degrees with water.

The extent to which a liquid is able to wet a surface plays a significant role in determining how the liquid and the surface will interact with each other. A high degree of wetting results in relatively large areas of liquid-surface contact, and is desirable in applications where a considerable amount of interaction between the two surfaces is beneficial, such as, for example, adhesive and coating process applications. Conversely, for applications requiring low solid-liquid interaction, the resistance to wetting is generally kept as high as possible in order to promote the formation of liquid drops having minimal contact area with the solid surface.

Many applications would benefit from the use of wetting-resistant surfaces and components having these surfaces that are resistant to wetting by liquid droplets. For example, aircraft components, such as airframe and engine components, and wind turbine components are susceptible to icing due to super-cooled water that remains in contact with the surface while the droplets freeze and accumulate as an agglomerated mass of ice. This may reduce the efficiency of the components and eventually may cause damage to these components.

In some embodiments, the surface is of a component of a turbine assembly. In some embodiments, the turbine assembly is selected from the group consisting of a gas turbine assembly, a steam turbine assembly, and a wind turbine assembly. In a wind turbine assembly, icing is a significant problem as the build-up of ice on various components such as anemometers and turbine blades reduces the efficiency and increases the safety risks of wind turbine operations. In one embodiment, the surface is of a component of the wind turbine selected from the group consisting of a turbine blade, an anemometer, and a gearbox. Exemplary components of the turbine assembly include, but are not limited to, a turbine blade, a low-pressure steam turbine blade, a high-pressure steam turbine blade, a compressor blade, a condenser, and a stator component.

In a steam turbine assembly, it is beneficial to have a steam condenser with wetting-resistant surfaces. Condensers with hydrophobic surfaces have a resistance for wetting by water. This behavior alters the mode of steam condensation on the surface. On hydrophilic surfaces, condensation of steam to water results in film formation. These water films act as large resistance to heat transfer. However, on hydrophobic surfaces, water droplets are nucleated from steam, grow to critical sizes and get shed as droplets resulting in drop wise condensation. This condensation mode is more efficient in transferring the latent heat of condensation. Consequently, the application of hydrophobic coatings on steam condensers may result in heat transfer enhancement. Contact angle of water and its hysteresis on a surface directs the drop shedding behavior of that surface and consequently the heat transfer enhancement.

In accordance with an embodiment of the invention, a method of coating a surface is disclosed. As used herein, the term "surface" is not construed to be limited to any shape or size, as it may be a layer of material, multiple layers or a block having at least one surface of which the wetting resistance is to be modified. In one embodiment, the surface is an outer surface of the tubes of a condenser. In an alternate embodiment, the surface is an inner surface of the tubes of a condenser. In one embodiment, the surface on which the coating is applied is a metal surface; "metal" as used herein includes alloy phases. Exemplary metals include steel, stainless steel, nickel, titanium, aluminum or any alloys thereof. In some embodiments, the metal includes a titanium-based alloy, an aluminum-based alloy, a cobalt-based alloy, a nickel-based alloy, an iron-based alloy or any combinations thereof. Further, the alloy may be a superalloy. In one particular embodiment, the superalloy is nickel-based or cobalt-based, wherein nickel or cobalt is the single largest elemental constituent by weight. Illustrative nickel-based alloy includes at least about 40 weight percent of nickel, and at least one component from the group consisting of cobalt, chromium, aluminum, tungsten, molybdenum, titanium and iron. Illustrative cobalt-based alloys include at least about 30 weight percent cobalt and at least one component from the group consisting of nickel, chromium, aluminum, tungsten, molybdenum, titanium and iron.

In some embodiments, the material constituting the surface comprises a ceramic. Non-limiting examples of a ceramic includes an oxide, a mixed oxide, a nitride, a boride or a carbide. Examples of suitable ceramics include, but are not limited to, carbides of silicon or tungsten; nitrides of boron, titanium, silicon, or titanium, and titanium oxynitride.

Figure 1:
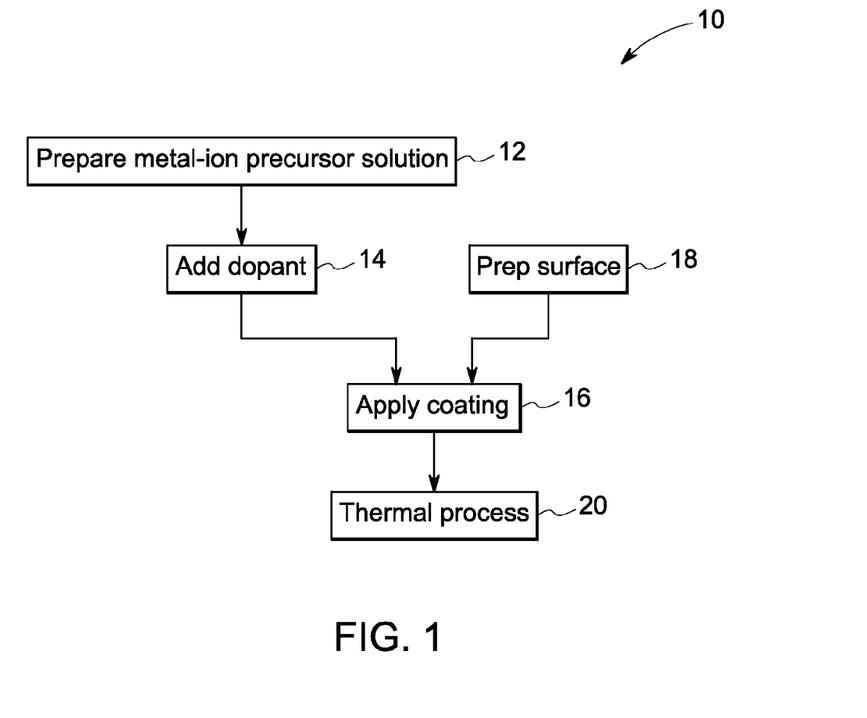
FIG. 1 is a process map of coating a surface, according to one embodiment of the invention.

FIG. 1 describes a method of coating a surface according to an embodiment of the present invention. The method 10 includes the steps of preparing a metal-ion precursor solution 12, adding a dopant 14 to the metal-ion precursor solution to prepare a doped metal-ion precursor solution; and applying the doped metal-ion precursor solution on the surface to form a coated surface 16. In one embodiment, the method 10 includes the step of cleaning the surface 18 before applying the coating. In one embodiment, the method includes an optional heat-treatment step 20 of the coated surface.

The metal-ion of the metal-ion precursor may be any metal including zirconium, aluminum, titanium, yttrium, ytterbium, silicon, cerium, lanthanum, or any of the combinations. Different precursors of the metal-ion may be used for preparing a metal-ion precursor solution. For example, the metal-ion precursor may be a metal organic precursor or an organometallic precursor. In one embodiment, the precursor organic group includes acetylacetonate, tetraisoproxide, tetreoctylate, n-butoxide, or any of the combinations.

In one embodiment, preparing a metal-ion precursor solution includes dissolving the metal-ion precursor in a solvent. Depending upon the metal-ion precursor and the required coating characteristics, solvents may be chosen. In one embodiment, the solvent used is an organic solvent. Examples of suitable liquids that may be used as the solvent are aprotic polar solvents such as alcohols, ketones, and other protic polar solvents such as benzene, toluene, and other non-polar solvents, and combinations comprising at least one of any of these liquids. In one embodiment, the solvent used includes an alcohol. In a further embodiment, the solvent includes a combination of alcohols for dissolving the metal-ion precursors. In one embodiment, alcohol protects the surface from water contamination.

Along with the metal-ion precursors and solvent used to dissolve the metal-ion precursors, the concentration of the metal-ion precursor dissolved in the solvent further influences the quality and thicknesses of a surface coating. For example, if the solution formed by dissolving the metal-ion precursor in the solvent is very dilute, the coating formed by that solution may become discontinuous or have low adherence to the surface. Multiple coating applications may have to be performed by a dilute solution to achieve the similar level of coating thickness that may be achieved by a single coating formed by a comparatively concentrated solution. Further, the uniformity and the surface roughness of the coating may vary between the coatings formed by a dilute solution and a concentrated solution. Furthermore, multiple coating applications by a dilute solution may not be cost effective due to the multiplicity of process steps and post-coating processes involved. Therefore, in one embodiment, a comparatively concentrated solution of metal-ion precursor in the solvent is used for coating the surface.

In one embodiment, zirconium is used as the metal-ion. The zirconium precursors that may be used includes zirconium acetylacetonate, zirconium tetraotylate, zirconium n-butoxide. In one embodiment, zirconium acetylacetonate (Also known as zirconium 2,4-pentanedionate and Zr—Ac—Ac) is used as a zirconium precursor along with an alcohol solvent.

Zr—Ac—Ac precursor is considered to be a sparingly soluble compound in an organic solvent. A solution of Zr—Ac—Ac in alcohol is normally available in a concentration less than about 0.2 molar percent. A more concentrated solution of Zr—Ac—Ac in alcohol may be beneficial in improving the coating quality as asserted earlier and thereby the coating induced properties of the surface. Therefore a higher concentration than 0.2 molar percent of Zr—Ac—Ac solution is beneficial for a hydrophobic surface coating. The higher concentration enables a uniform, thick film to be deposited in a single application.

The inventors of this application discovered high solubility of Zr—Ac—Ac in an alcohol by dissolving the precursor in the solvent at an elevated temperature. In a further embodiment, refluxing the precursor in alcohol in a sealed apparatus at high temperature further aids in increasing the solubility. The metal-ion precursor may be dissolved at a temperature in the range from about 80° C. to about 130° C. The temperature of refluxing may be varied from about 130° C. to about 165° C. during refluxing, in order to increase the solubility of the Zr—Ac—Ac. The inventors further discovered that refluxing the solution for a prolonged period of time increases the stability of Zr—Ac—Ac solution. In one embodiment, the Zr—Ac—Ac solution is refluxed for up to about 24 hours to stabilize the solution. A Zr—Ac—Ac solution refluxed for about 24 hours after dissolving in the alcohol solvent is found to be stable for a period ranging from about 6 months to about 12 months.

In one embodiment, the alcohol used includes ethanol, butanol, cyclo-hexanol or some combination of these. In one embodiment, the process used for application of coating suggests the choice of alcohol system used as the solvent. Dip coating, brush painting, spray coating, are some of the example methods that may be used for coating a surface. In one embodiment, a mixture of butanol and cyclo-hexanol is used as a solvent for Zr—Ac—Ac and the coating. In one embodiment, the coating is applied to the surface using brush painting. In one particular embodiment, the solvent formulation used includes about 40 percent cyclo-hexanol and about 60 percent butanol. In experimental trials this mixture provided a uniform self-leveling film that aided drying to a defect-free coating on the applied surface.

In one embodiment, a Zr—Ac—Ac concentration of greater than about 0.6 molar percent is prepared by using a high temperature while dissolving/refluxing. The temperature for dissolving is greater than about 100° C. and the temperature of refluxing is greater than about 150° C. In one embodiment, a Zr—Ac—Ac solution of molar concentration of about 0.8 percent is prepared in an alcohol mixture comprising about 40 percent of cyclo-hexanol and about 60 percent of butanol.

In one embodiment, the method of preparing a coated surface includes inclusion of a dopant to the metal-ion precursor solution thereby forming a doped metal-ion precursor solution. In some embodiments, the dopant includes a silane, fluoro-silane, or a fluoro-alkyl silane (also known as FAS). Non-limiting examples of a fluoro-alkylsilane includes tridecafluoro 1,1,2,2-tetrahydrofluoro octyl trichlorosilane, and heptadecafluoro-1,1,2,2-tetrahydrodecyl trimethoxysilane. In one embodiment, a fluoro-silane doped compound includes a solvent and a fluoro-silane dopant. Not to be limited by any theory, the inventors of this application suggest that the number of fluorine atoms present and the length of the polymeric back bone chain of the dopant may play a role in the effective hydrophobicity of the coating formed by the doped metal-ion precursor solution.

In one embodiment, the dopant includes heptadecafluoro-1,1,2,2-tetrahydrodecyl trimethoxysilane. This compound has 17 fluorine atoms present in the compound formula that imparts a high hydrophobicity to the applied coating. In one embodiment, the amount of FAS present in the solution is in a range from about 2 molar percent to about 32 molar percent of metal-ion precursor. In one embodiment, the amount of FAS present in the metal-ion precursor solution is about 4 molar percent of metal-ion precursor. In one embodiment, a 4 molar percent doping of heptadecafluoro-1,1,2,2-tetrahydrodecyl trimethoxysilane with respect to zirconium in the Zr—Ac—Ac solution in alcohol is found to provide optimal performance and the minimal amount of fluorine loss during the life of the coating in service. In one embodiment of the method, the FAS is added to the solution at room temperature and mixed over a span of time. In one embodiment, the mixing of FAS with the metal-ion precursor solution is carried out for a minimum of about 4 hours to ensure dispersion into the precursor.

In one embodiment, the coating applied using the doped metal-ion precursor solution on a surface undergoes a hydrolysis condensation reaction forming an organo-metallic polymer hybrid coating over the surface. In one embodiment, the as coated surface is used as a hydrophobic coating for the intended applications. In a further embodiment, the coating applied over the surface is partially converted through heat-treatment to further increase the functionality of the hydrophobic coating. Generally heat-treating the applied coating to a high temperature and extended time results in fluorine loss and therefore decrease in the hydrophobic nature of the coating. For example, heat-treatment of the coating at temperatures in excess of about 350° C. for times longer than about 5 minutes may result in fluorine loss from the coating and hence leads to performance degradation as a hydrophobic coating. Further, inventors discovered that a partial conversion of coating by heat-treatment of the coated surface enhances the performance of the coated surface. The heat-treatment may be at a temperature less than about 350° C. In one embodiment, the temperature of heat-treatment of the coated surface is carried out at a temperature within a range of about 200° C. to about 325° C. In a particular embodiment, the coating is heat treated at a temperature of about 250° C. The heat-treatment time may vary from about 2 minutes to about 45 minutes. In one embodiment, the heat-treatment is carried out for a time less than about 30 minutes. In one embodiment, the heat-treatment is carried out for about 15 minutes. The heat-treated and partially converted surface may have enhanced hydrophobicity, enhanced coating addition to the surface, enhanced robustness for the working conditions, extended service life, and increased abrasion resistance when compared to the as deposited solution coating. Further, the wetting resistance of the heat-treated surface is found to be increased upon exposure to steam. This may be due to reduction in the contact angle hysteresis of water drops on the surface.

Figure 2:
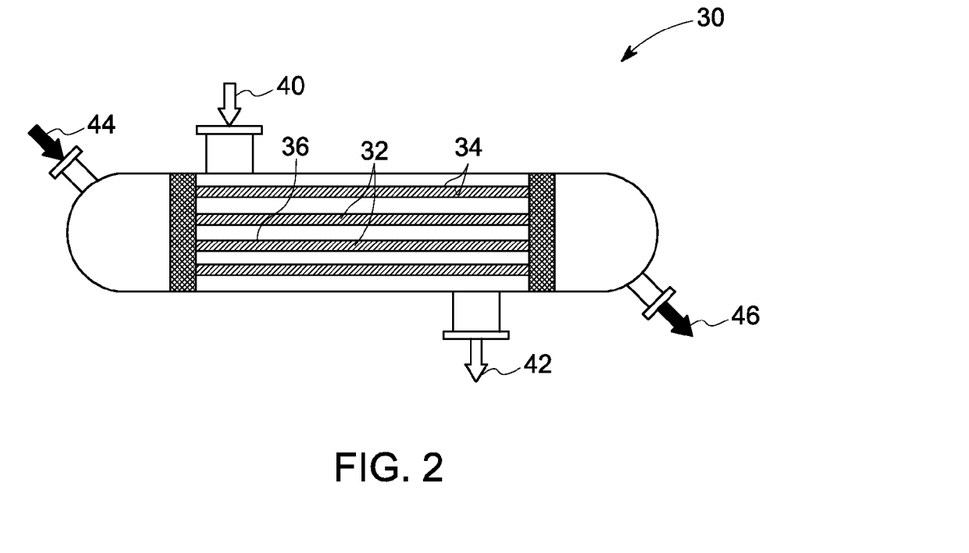
FIG. 2 is a schematic view of an article including coated components, according to one embodiment of the invention.

In one embodiment, an article 30 is presented as shown in FIG. 2. The article 30 includes a component 32 having a coated surface 34. The coated surface 34 includes a coating 36 that includes a metal-ion-fluoro-silane compound.

In one embodiment, the coating 36 of the component 32 is prepared and applied using the method steps described earlier. In one embodiment, the coating 36 of the component 32 has a thickness in the range from about 200 nanometers to about 1 micrometer. The component 32 of the article 30 may have an inner surface and an outer surface and the coating 36 is applied to the inner surface, outer surface or both the surfaces. In one embodiment, the coated component 32 is a condenser tube as shown in FIG. 2. The coated condenser tube 32 may be used in a steam turbine, with a steam inlet 40, a condensate outlet 42, cooling liquid inlet 44, and cooling liquid outlet 46. Due to the coated surface 36 created by the coating and process described earlier, the heat transfer from the steam is carried out effectively by enabling a better surface-steam reaction area due to drop wise shedding off the surface water of the condenser tube.

EXAMPLE

The following example illustrates methods, materials and results, in accordance with specific embodiments, and as such should not be construed as imposing limitations upon the claims. The variations, inclusion or circumventing certain steps, and modifying the steps are considered to be known to a person skilled in the art.

Figure 3:
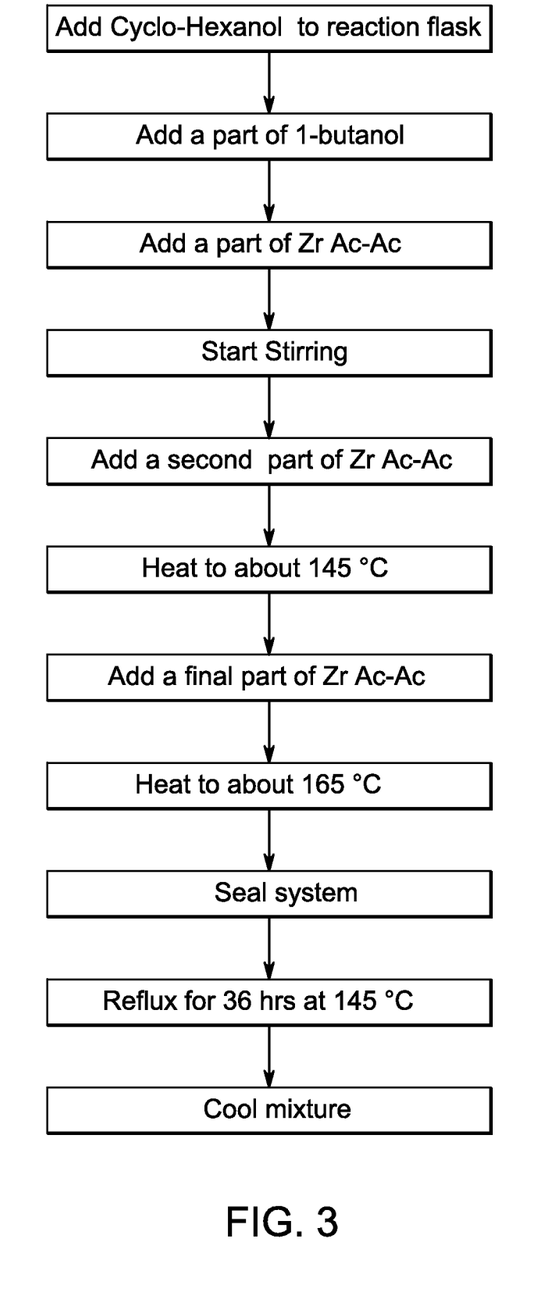
FIG. 3 is a process map for preparing a metal-ion precursor solution, according to one embodiment of the invention.

FIGS. 3-7 present the steps of coating a surface in an example embodiment. FIG. 3 describes the typical steps of preparing a zirconium-ion precursor solution. The reaction setup used included a round bottom flask, an overhead stirrer, a reflux condenser, a feed port, and a heating jacket. A Zr—Ac—Ac precursor was taken in an amount required for the coating of a condenser tube and divided into 3 parts. An alcohol mixture was heated in a water bath. In one example, a mixture of butanol and cyclo-hexanol was used as the solvent. The cyclo-hexanol was measured and heated in a water bath to melt and then it was added to the reaction vessel. Butanol was divided into 4 parts and one part of the butanol was added to the reaction vessel. A first part of the Zr—Ac—Ac precursor was added to the reaction vessel. The container holding this part of the Zr—Ac—Ac was washed with one part of butanol and added to the reaction vessel. Stirring of the contents of the reaction vessel was started and the speed of stirring was set to about 75 rpm. After allowing sufficient time for dissolving the first part, the second part of Zr—Ac—Ac was added to the reaction vessel, washed out with another part of the butanol. The stirring was continued at about 75 rpm and the temperature was slowly increased to about 145° C. The final part of Zr—Ac—Ac precursor was added slowly while the heating and stirring was continuously on. The final part of the Zr—Ac—Ac was washed in with the final part of the butanol that had been set aside. The temperature of the reaction vessel was maintained at 145° C. The stirring was continued, the reaction vessel was sealed and the refluxing was started. The refluxing was continued for about 36 hours. The solution attained a transparent reddish yellow color when the solution was stabilized. The solution was cooled to room temperature.

Figure 4:
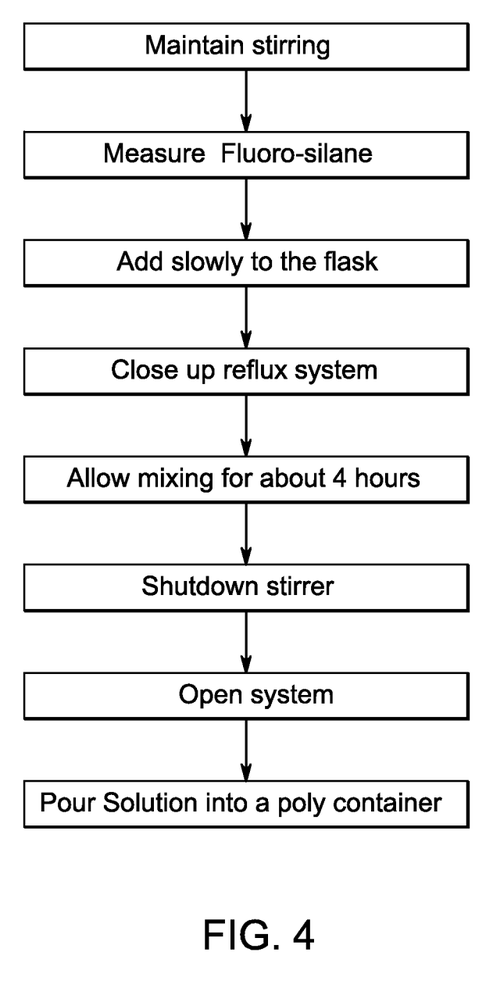
FIG. 4 is a process map for preparing a doped metal-ion precursor solution, according to one embodiment of the invention.

FIG. 4 describes doping of Zr—Ac—Ac solution by a fluoro-silane. After ensuring that the solution was stable by observing the color for several hours, the solution was stirred at a rate of about 75 rpm. A compound $C_{13}H_{13}F_{17}O_3Si$ equivalent to an amount of about 4 molar percent of zirconium was measured and added slowly to the reaction vessel. The reflux system was closed down and the stirring continued at room temperature for about 4 hours. The contents were transferred to a dip coating bath to coat condenser tubes.

Figure 5:
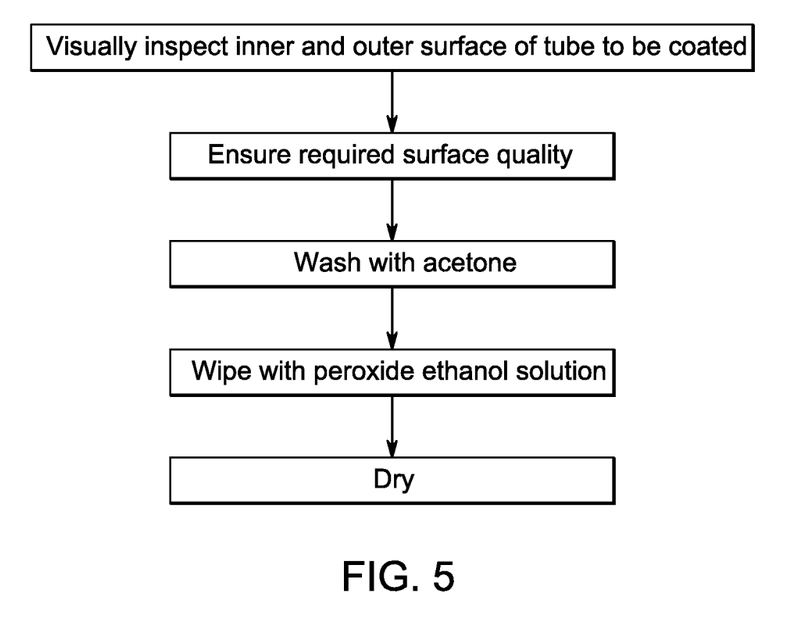
FIG. 5 is a process map for preparing a component for coating, according to one embodiment of the invention.

FIG. 5 describes the preparation of a condenser tube for coating. The tube was visually inspected inside and outside for defects and checked for its straightness. The tube was immersed in an acetone wash bath and then wiped clean and placed in a holder for coating. The surface of the tube was hydroxylated by wiping the surface with a wipe immersed in 10 percent hydrogen peroxide mixed with pure ethanol. The tube was allowed to dry for 5 minutes prior to coating application.

Figure 6:
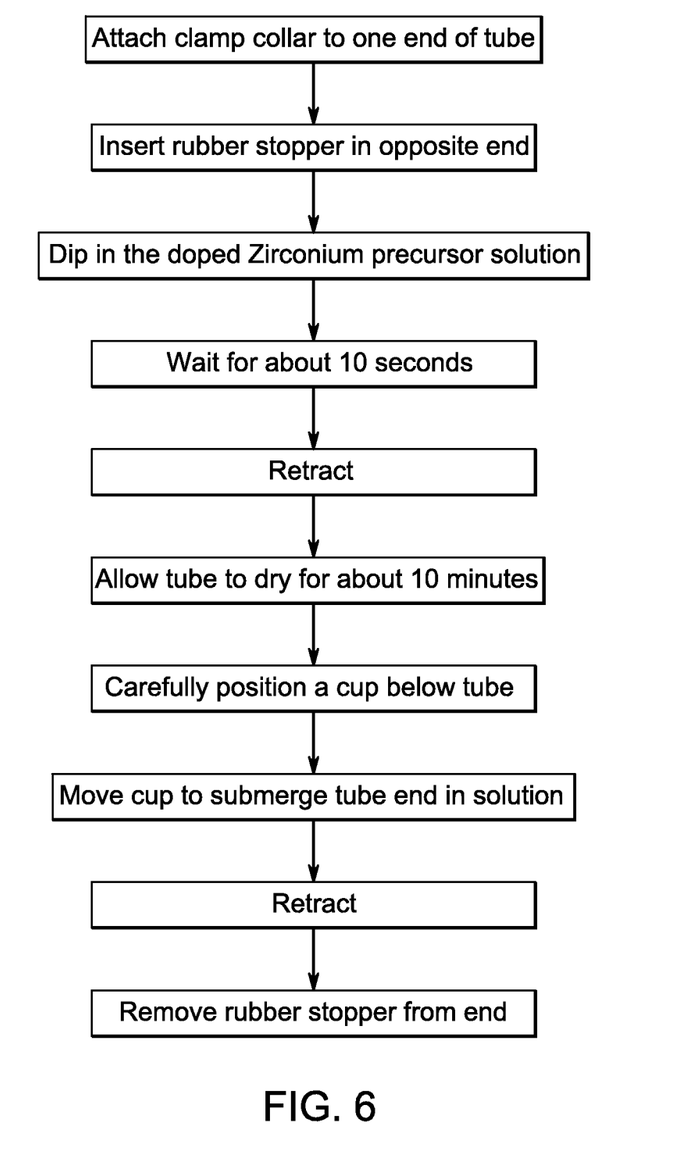
FIG. 6 is a process map for preparing a coating on the surface, according to one embodiment of the invention.

FIG. 6 describes the method of coating a condenser tube. One end of the tube was attached with a clamp collar and a rubber stopper was inserted at the other end. The tube collar was slid on a support rod. The tube was slowly dipped into the doped Zr—Ac—Ac coating solution bath, waited for about 10 seconds and was slowly retracted from the coating solution and allowed to dry. The bottom end was dipped in an acetone-containing wash cup to remove coating solution from a short section, and allowed to dry. The rubber stopper and the clamps were removed from the coated tube.

It is observed by the inventors that in a dip coating of the doped metal-ion precursor solution to a tube, dip rate of the tube into the solution alters the uniformity, thickness and hydrophobicity of the coated surfaces. A slower dip rate than about 3 cm/min may provide a non-uniform coating and reduce the static contact angle of a water drop on the surface. A higher dip rate than about 15 cm/min may reduce the static contact angle of a water drop on the surface. A dip rate in the range from about 3 cm/min to about 15 cm/min is found to be beneficial for the uniformity, static contact angle and reduced hysteresis of the contact angle. In one embodiment, a dip rate of about 10 cm/min provided a uniform coating with about 115° static contact angle with a water drop and hysteresis of about 45° on an as coated surface.

Figure 7:
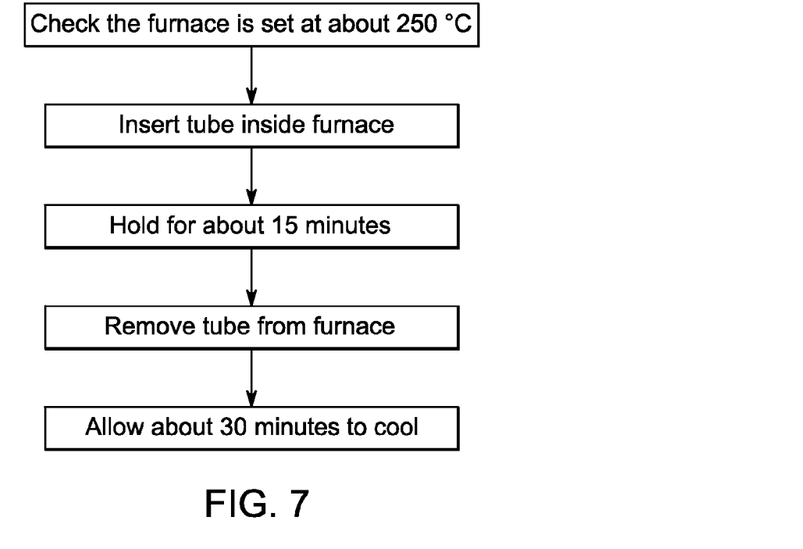
FIG. 7 is a process map of heat-treatment of the coated surface, according to one embodiment of the invention.

FIG. 7 describes the thermal treatment step of the coated tube. The furnace was held at a temperature of about 250° C. and the condenser tube was positioned inside the furnace using a support. The tube was held at about 250° C. for about 15 minutes and then retracted from the furnace, and allowed to cool to room temperature. Thus the thermal treatment of this coating entailed a rapid ramp into an air atmosphere furnace, short dwell at temperature, followed by a quench in open air.

Both high contact angle and low hysteresis may be desirable for efficient heat transfer through drop wise condensation of steam. Uncoated steel surfaces, which show film wise condensation, had contact angles as high as 80 degrees with hysteresis of about 60 degrees. The coatings of some of the embodiments of the present invention had contact angles of greater than about 95 degrees with hysteresis lower than about 50 degrees.

Figure 8:
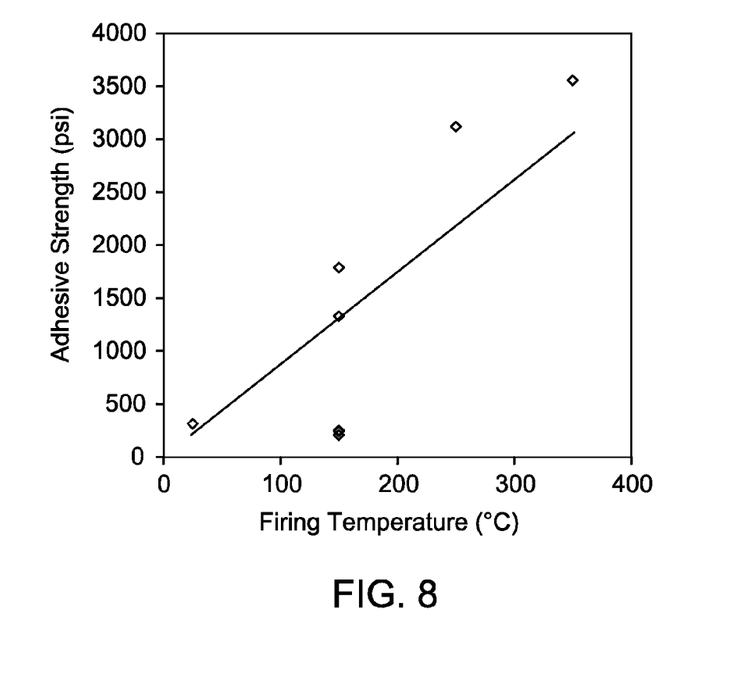
FIG. 8 is an illustration of adhesion strength of a coating on a coated surface with respect to the temperature of heat-treatment, according to one embodiment of the invention.

A partial conversion, of an as-coated coating on a coated surface by a controlled heat-treatment proved to be beneficial for the heat transfer application of the articles including the coated surfaces. FIG. 8 illustrates the adhesion strength of the heat-treated and partially converted coating with respect to temperature of heat-treatment for a brush-coated stainless steel flat surface. The adhesion test was performed by pulling on a pin that was epoxied to the coated surface. In the figure, it can be seen that the adhesion strength increases as the temperature of heat-treatment increases. The adhesion strength increased by a factor of about 10 from as coated surface to the surface that was heat treated at 250° C.

Figure 9:
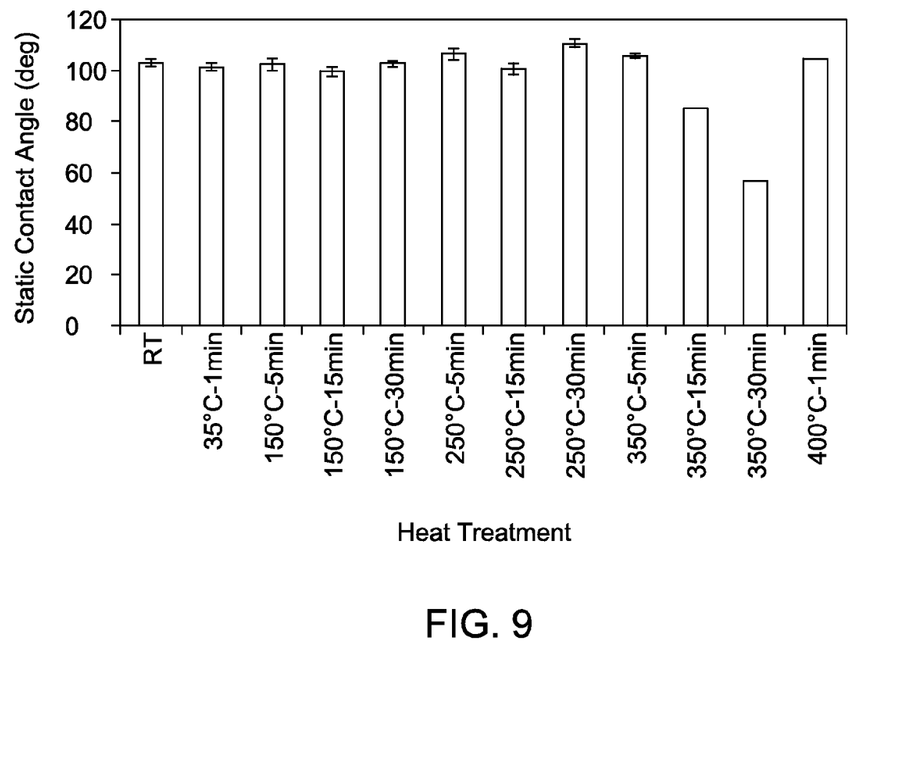
FIG. 9 is an illustration of static contact angle of water on a coated surface as a function of heat-treatment conditions, according to one embodiment of the invention.

FIG. 9 illustrates the variation of static contact angle of water on a coated surface with respect to the heat-treatment conditions of the coated surface. It can be seen that the static contact angle varies with respect to the heat-treatment temperature and time and is observed to be maximum at a temperature of about 250° C. and time duration of about 30 minutes in this example.

It was experimentally observed that the partially converted coated surface obtained by heat-treating the surface at a temperature greater than or equal to about 200° C. withstood steam exposure and provided drop-wise condensation. The contact angle of a water drop remained stable while the contact angle hysteresis dropped by about 10 to 30 degrees upon exposure to steam. The hysteresis on such a tube was typically less than about 50 and was observed to be around 30-40 degrees before steam exposure and 20-30 degrees after steam exposure. The drop in hysteresis is beneficial for the heat-transfer enhancement of the coated surfaces.

The hydrophobic behavior of the coating thus formed resulted in drop wise condensation of steam on the coated condensation tubes. This condensation mode results in increased heat transfer due to continual growth and shedding of drops as opposed to film formation on hydrophilic surfaces. The coating upon exposure to steam for about 3500 hours retained its hydrophobic behavior and showed a very low contact angle hysteresis. Consequently, the drops shed at very small sizes and the heat transfer was increased.

Tubes were coated with a coating in accordance with the above description and the total heat transfer enhancement was measured at steam pressures and cooling water Reynolds numbers similar to those for operating condensers. An increase in total heat transfer coefficient of about 1.4 times that of uncoated steel tubes was achieved. Therefore, the coating demonstrated significant heat transfer enhancement in a steam condenser environment.

While the invention has been described in detail in connection with only a limited number of embodiments, it should be readily understood that the invention is not limited to such disclosed embodiments. Rather, the invention may be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method of coating a surface, comprising:
applying a fluoro-silane doped metal-ion precursor solution on the surface to form a coated surface, wherein the metal-ion precursor solution comprises greater than about 0.6 molar percent concentration of a metal-ion precursor in a solvent comprising an alcohol.

2. The method of claim 1, wherein the alcohol comprises cyclohexanol, ethanol, butanol, or a combination of any of the foregoing.

3. The method of claim 1, wherein the fluoro-silane comprises heptadecafluoro-1,1,2,2-tetrahydrodecyl trimethoxysilane.

4. The method of claim 1, wherein the doped metal-ion precursor solution comprises the fluoro-silane in an amount in the range from about 2 molar percent to 32 molar percent of metal-ion precursor.

5. The method of claim 1, wherein the method of applying the doped metal-ion precursor solution comprises dip coating, spray coating, brush painting, or spin coating.

6. The method of claim 1, wherein the metal-ion precursor comprises zirconium, aluminum, titanium, yttrium, ytterbium, silicon, cerium, lanthanum, or combinations thereof.

7. The method of claim 6, wherein the metal ion precursor comprises a zirconium precursor.

8. The method of claim 7, wherein the zirconium precursor comprises zirconium 2,4-pentanedionate.

9. An article, comprising a component having a coated surface, wherein the coated surface comprises a coating prepared by the process of claim 1.

10. The article of claim 9, wherein the coating has a thickness in the range from about 200 nanometers to about 1 micrometers.

11. The article of claim 9, wherein the component comprises an inner surface and an outer surface.

12. The article of claim 11, wherein the coating is disposed on the outer surface of the component.

13. The article of claim 11, wherein the coating is disposed on the inner surface of the component.

14. The article of claim 9, wherein the component is a condenser tube.

15. The method of claim 1, further comprising heat-treating the coated surface at a temperature less than about 330° C. to form a partially converted-coated surface.

16. The method of claim 15, wherein heat-treating the coated surface comprises heat treating at a temperature in a range from about 150° C. to about 300° C.

17. The method of claim 15, wherein the heat treating is carried out for a time duration from about 5 minutes to about 45 minutes.

18. An article, comprising a component having a coated surface, wherein the coated surface comprises a coating prepared by the process of claim 15.

19. The article of claim 18, wherein the coating is adhered to the surface with an adhesion strength of at least about 17 MPa.

20. The method of claim 1, further comprising dissolving the metal-ion precursor in the solvent at a temperature greater than about 100° C. and refluxing at a temperature greater than about 150° C.

21. The method of claim 20, further comprising adding a fluoro-silane to the solvent to form the doped metal-ion precursor solution.

22. A method, comprising:
preparing a metal-ion precursor solution of greater than about 0.6 molar percent concentration by dissolving a metal-ion precursor in a solvent comprising an alcohol at a temperature greater than about 100° C. and refluxing at a temperature greater than about 150° C.; and adding a fluoro-silane to the metal-ion precursor solution to prepare a doped metal-ion precursor solution.

23. The method of claim 22, wherein the metal ion precursor comprises a zirconium precursor.

24. The method of claim 22, wherein the alcohol comprises cyclohexanol, ethanol, butanol, or a combination of any of the foregoing.

25. The method of claim 22, wherein the fluoro-silane comprises heptadecafluoro-1,1,2,2-tetrahydrodecyl tri-methoxysilane.

26. The method of claim 22, wherein the doped metal-ion precursor solution comprises the fluoro-silane in an amount in the range from about 2 molar percent to 32 molar percent of metal-ion.

27. A method of coating a surface, comprising:

applying a heptadecafluoro-1,1,2,2-tetrahydrodecyl tri-methoxysilane doped metal-ion precursor solution on the surface to prepare a coated surface, wherein the precursor solution comprises greater than about 0.6 molar percent concentration of a metal-ion precursor in a solvent comprising an alcohol; and heat-treating the coated surface in a temperature range from about 200° C. to about 300° C. for about 30 minutes.

28. The method of claim 27, wherein the alcohol comprises a mixture of cyclo-hexanol and 1-butanol.

29. The method of claim 27, wherein the metal ion precursor comprises a zirconium precursor.

* * * * *